US012604287B2

(12) United States Patent
Wu et al.

(10) Patent No.: US 12,604,287 B2
(45) Date of Patent: Apr. 14, 2026

(54) WIRELESS MODEM AND OPERATION METHOD THEREOF

(71) Applicant: MEDIATEK Inc., Hsinchu City (TW)

(72) Inventors: Nien-En Wu, Hsinchu City (TW);
Yu-Hsin Liu, Hsinchu City (TW);
Shang-Lin Tsai, Hsinchu City (TW);
Lai-En Fan, Hsinchu City (TW);
Ming-Ying Tu, Hsinchu City (TW);
Chen-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 462 days.

(21) Appl. No.: 18/450,446

(22) Filed: Aug. 16, 2023

(65) Prior Publication Data

US 2024/0064673 A1     Feb. 22, 2024

Related U.S. Application Data

(60) Provisional application No. 63/371,889, filed on Aug. 19, 2022.

(51) Int. Cl.
H04W 56/00       (2009.01)
H04W 68/00       (2009.01)
H04W 88/02       (2009.01)

(52) U.S. Cl.
CPC ......... *H04W 56/003* (2013.01); *H04W 68/00* (2013.01); *H04W 88/02* (2013.01)

(58) Field of Classification Search
CPC .... H04W 56/003; H04W 68/00; H04W 88/02
See application file for complete search history.

(56) References Cited

U.S. PATENT DOCUMENTS

| | | | | |
|---|---|---|---|---|
| 11,303,338 B2 * | 4/2022 | Kim | ....................... | H04B 7/022 |
| 2020/0267649 A1 * | 8/2020 | Chang | .................... | H04W 4/44 |
| 2020/0412427 A1 * | 12/2020 | Kim | ....................... | H04L 25/03 |

* cited by examiner

*Primary Examiner* — Ankur Jain
(74) *Attorney, Agent, or Firm* — McClure, Qualey & Rodack, LLP

(57) ABSTRACT

A wireless modem and an operation method thereof are provided. The operation method of the wireless modem includes the following steps. A communication signal is buffered in a storage unit when the communication signal is received. The communication signal is a paging early indicator (PEI) signal, a paging signal or a radio resource management (RRM) signal. A synchronization procedure is performed, when a reference signal is received. The communication signal is fetched from the storage unit, when the synchronization procedure is finished. A compensation procedure is performed on the communication signal. The communication signal which is compensated is demodulated.

18 Claims, 8 Drawing Sheets

S_RS,
S_CM

WIRELESS MODEM AND OPERATION METHOD THEREOF

This application claims the benefit of U.S. provisional application Ser. No. 63/371,889, filed Aug. 19, 2022, the disclosure of which is incorporated by reference herein in its entirety.

TECHNICAL FIELD

The disclosure relates in general to an electronic component and an operation method thereof, and more particularly to a wireless modem and an operation method thereof.

BACKGROUND

Power saving is critical in wireless modem designs. When the wireless modem is operated, some communication signals are received from the eNB.

To successfully receive the communication signals, synchronization is necessary to correct timing and frequency offset caused by channel or clock drift of the user equipment before the data signal demodulation.

The communication signal and the reference signal (RS) for synchronization could have any time relation. Specifically, the communication signal could be close to (either preceding or succeeding) or overlapped with the reference signal, so that the synchronization results could be unavailable before communication signal demodulation.

In convention, the synchronization must be performed on the previous reference signal (instead of the reference signal closest to the communication signal). However, it will lead to additionally user equipment wake-up time and equivalently, more power consumption.

SUMMARY

The disclosure is directed to a wireless modem and an operation method thereof. A communication signal is buffered. Regardless of whether a closest reference signal or the communication signal is received first, the communication signal could be fetched immediately after the synchronization procedure is finished and then the compensation procedure and the demodulation procedure of the communication signal could be performed consecutively. Therefore, the power consumption could be greatly reduced.

According to one embodiment, an operation method of a wireless modem is provided. The operation method of the wireless modem includes the following steps. A communication signal is buffered in a storage unit when the communication signal is received. The communication signal is a paging early indicator (PEI) signal, a paging signal or a radio resource management (RRM) signal. A synchronization procedure is performed, when a reference signal is received. The communication signal is fetched from the storage unit, when the synchronization procedure is finished. A compensation procedure is performed on the communication signal. The communication signal which is compensated is demodulated.

According to another embodiment, a wireless modem is provided. The wireless modem includes a receiving unit, a storage unit, a synchronization unit, a compensation unit and a demodulation unit. The receiving unit is configured to receive a communication signal and a reference signal. The communication signal is a paging early indicator (PEI) signal, a paging signal or a radio resource management (RRM) signal. The storage unit is configured to buffer the communication signal when the communication signal is received. The synchronization unit is configured to perform a synchronization procedure when the reference signal is received. The compensation unit is configured to fetch the communication signal from the storage unit when the synchronization procedure is finished, and perform a compensation procedure on the communication signal. The demodulation unit is configured to demodulate the communication signal which is compensated.

Figure 1:
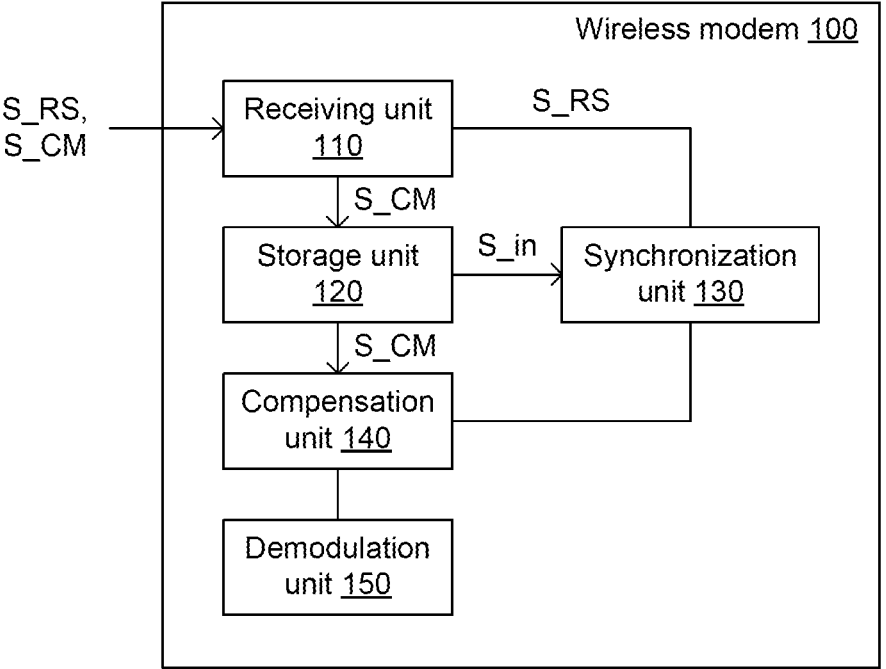
FIG. 1 shows a block diagram of a wireless modem according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a block diagram of a wireless modem 100 according to one embodiment. The wireless modem 100 may be equipped in a smart phone, a laptop, or a tablet computer. In this embodiment, the wireless modem 100 includes a receiving unit 110, a storage unit 120, a synchronization unit 130, a compensation unit 140 and a demodulation unit 150. The receiving unit 110 is used to receive a reference signal S_RS or a communication signal S_CM, such as a paging early indicator (PEI) signal, a paging signal, or a radio resource management (RRM) signal. The storage unit 120 is used to store signals and data. The synchronization unit 150, the compensation unit 140 and the demodulation unit 150 are used to perform several signal processing procedures. The storage unit 120 is, for example, a memory or a register. The receiving unit 110, the synchronization unit 130, the compensation unit 140 and/or the demodulation unit 150 are/is, for example, a circuit, a chip, a firmware, a circuit board, a storage device storing a plurality of program codes. To successfully receive the communication signal S_CM, a synchronization procedure is necessary to correct timing and frequency offset caused by channel or clock drift of the user equipment. In this embodiment, the communication signal S_CM is buffered in the storage unit 120, and the synchronization procedure could be performed according to the closest reference signal S_RS without waiting to receive the communication signal S_CM. The operation of those components is illustrated via a following flowchart.

Figure 2:
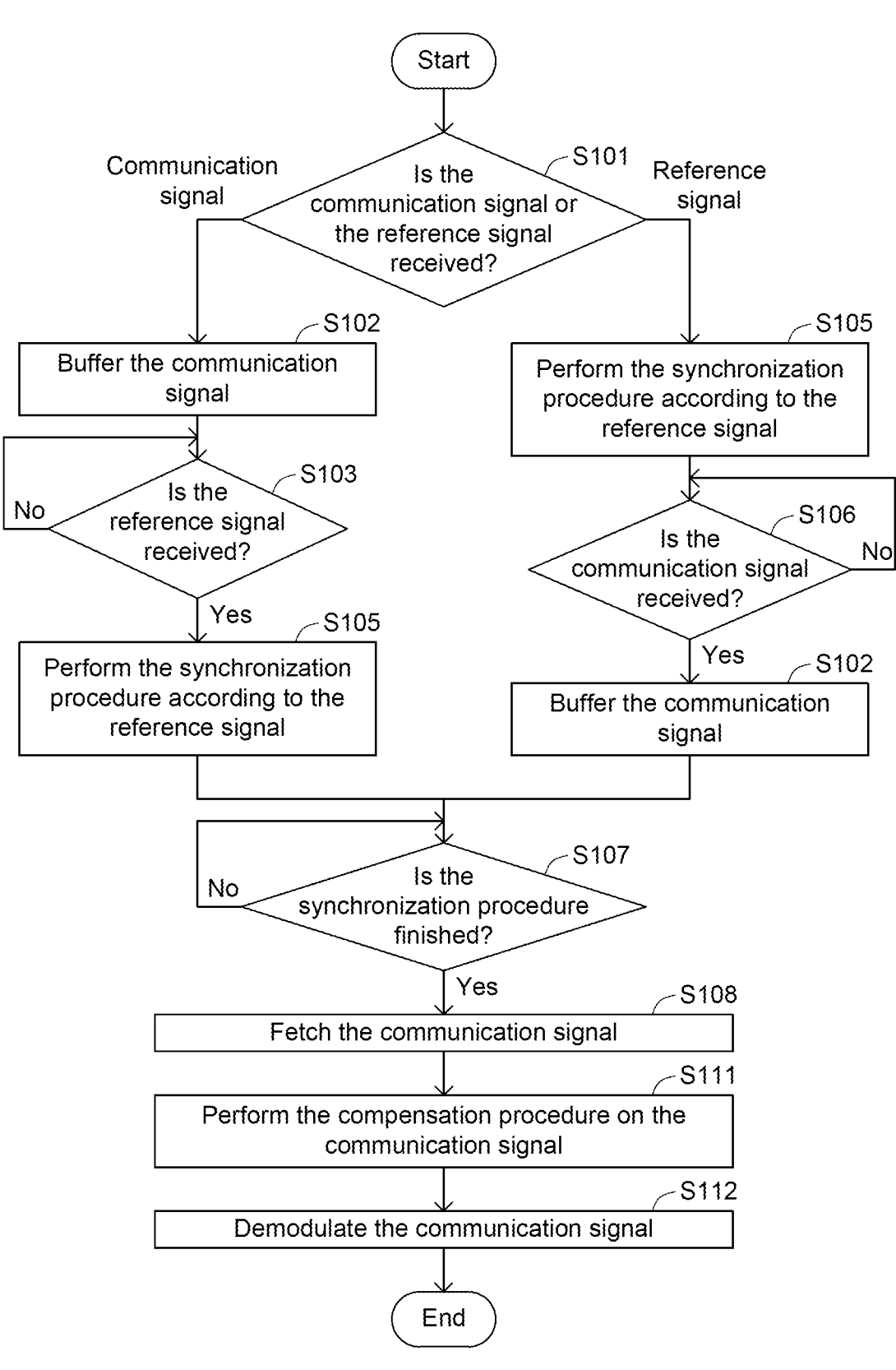
FIG. 2 shows a flowchart of an operation method of the wireless modem according to one embodiment.
Figure 3:
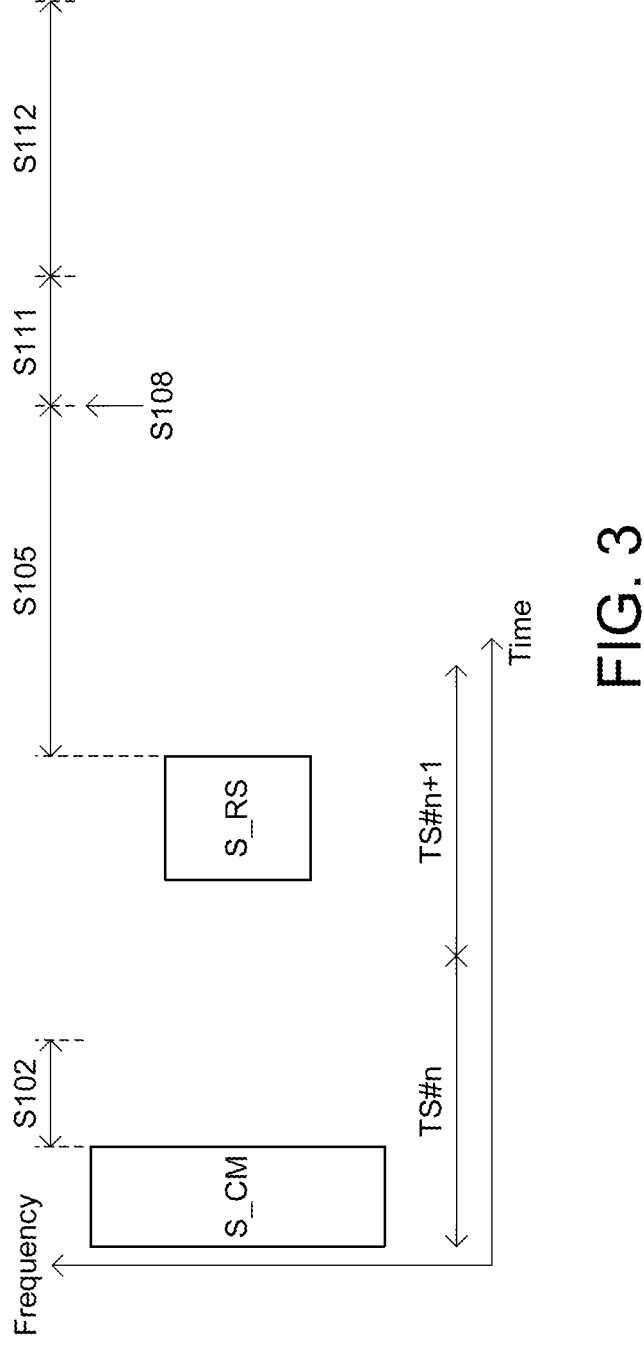
FIG. 3 illustrates the operation method of the wireless modem according to one example.

Please refer to FIG. 2 and FIG. 3. FIG. 2 shows a flowchart of an operation method of the wireless modem 100 according to one embodiment. FIG. 3 illustrates the operation method of the wireless modem 100 according to one example. In the step S101, whether the communication signal S_CM or the reference signal S_RS is received is determined. If the communication signal S_CM is received, the process proceeds to the step S102; if the reference signal S_RS is received, the process proceeds to the step S105.

As shown in the FIG. 3, the communication signal S_CM is received at the time slot TS #n and the reference signal S_RS is received at the time slot TS #n+1. The communication signal S_CM is received before the reference signal S_RS, so the process proceeds to the step S102.

In the step S102, the communication signal S_CM is buffered in the storage unit 120.

Next, in the step S103, whether the reference signal S_RS is received is determined. If the reference signal S_RS is received, the process proceeds to the step S105.

As shown in the FIG. 3, the process proceeds to the step S105 when the reference signal S_RS is received.

In the step S105, the synchronization unit 130 performs a synchronization procedure according to the reference signal S_RS.

Then, in the step S107, whether the synchronization procedure is finished is determined. If the synchronization procedure is finished, the process proceeds to the step S108.

In the step S108, the compensation unit 140 fetches the communication signal S_CM from the storage unit 120.

Next, in the step S111, the compensation unit 140 performs a compensation procedure on the communication signal S_CM.

Afterwards, in the step S112, the demodulation unit 150 demodulates the communication signal S_CM which is compensated. As shown in the FIG. 3, when the step S105 of performing the synchronization procedure is finished, the step S108 of fetching the communication signal S_CM from the storage unit 120 is immediately executed. Then, the step S111 of performing the compensation procedure on the communication signal S_CM and the step S112 of demodulating the communication signal S_CM are executed consecutively.

According to the example illustrated in the FIG. 3, even if the closest reference signal S_RS is received after the communication signal S_CM, this closest reference signal S_RS still could be used for the synchronization procedure. Therefore, the power consumption could be greatly reduced.

Figure 4:
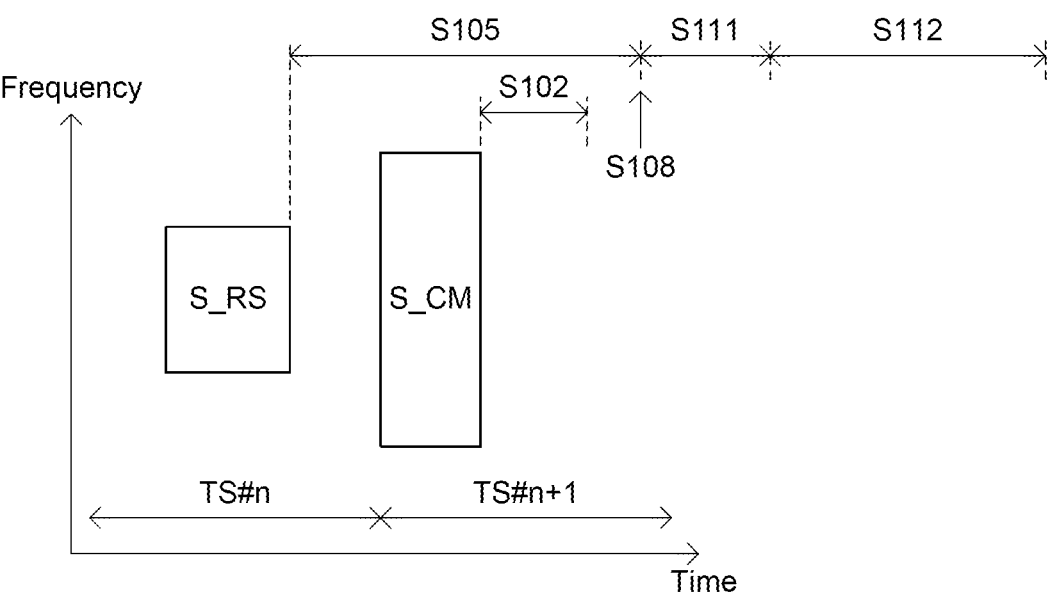
FIG. 4 illustrates the operation method of the wireless modem according to another example.

Please refer to FIG. 2 and FIG. 4. FIG. 4 illustrates the operation method of the wireless modem 100 according to another example. In step S101, whether the communication signal S_CM or the reference signal S_RS is received is determined. As shown in the FIG. 4, the reference signal S_RS is received at the time slot TS #n and the communication signal S_CM is received at the time slot TS #n+1. The reference signal S_RS is received before the communication signal S_CM, so the process proceeds to the step S105.

In the step S105, the synchronization unit 130 performs the synchronization procedure according to the reference signal S_RS.

Next, in the step S106, whether the communication signal S_CM is received is determined. If the communication signal S_CM is received is received, the process proceeds to the step S102.

As shown in the FIG. 4, when the communication signal S_CM is received, the process proceeds to the step S102.

In the step S102, the communication signal S_CM is buffered in the storage unit 120. As shown in the FIG. 4, the step S102 of buffering the communication signal S_CM is performed during the step S105 of performing the synchronization procedure.

Then, in the step S107, whether the synchronization procedure is finished is determined. If the synchronization procedure is finished, the process proceeds to the step S108.

In the step S108, the compensation unit 140 fetches the communication signal S_CM from the storage unit 120.

Next, in the step S111, the compensation unit 140 performs the compensation procedure on the communication signal S_CM.

Afterwards, in the step S112, the demodulation unit 150 demodulates the communication signal S_CM which is compensated. As shown in the FIG. 4, when the step S105 of performing the synchronization procedure is finished, the step S108 of fetching the communication signal S_CM from the storage unit 120 is immediately executed. Then, the step S111 of performing the compensation procedure on the communication signal S_CM and the step S112 of demodulating the communication signal S_CM are executed consecutively.

According to the example illustrated in the FIG. 4, even if the synchronization procedure executed based on the closest reference signal S_R cannot be finished before receiving the communication signal S_CM, the communication signal S_CM could be buffered and then fetched out when the synchronization procedure is finished. Therefore, the power consumption could be greatly reduced.

Figure 5:
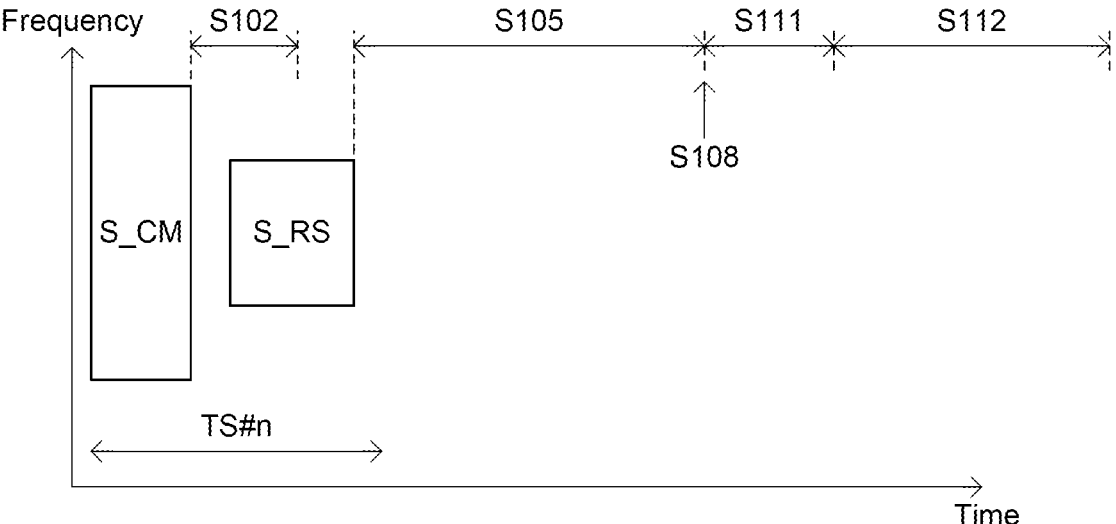
FIG. 5 illustrates the operation method of the wireless modem according to another example.

Please refer to FIG. 2 and FIG. 5. FIG. 5 illustrates the operation method of the wireless modem 100 according to another example. In step S101, whether the communication signal S_CM or the reference signal S_RS is received is determined.

As shown in the FIG. 5, the communication signal S_CM and the reference signal S_RS are received at the same time slot TS #n. The communication signal S_CM is received before the reference signal S_RS, so the process proceeds to the step S102.

In the step S102, the communication signal S_CM is buffered in the storage unit 120.

Next, in the step S103, whether the reference signal S_RS is received is determined. If the reference signal S_RS is received is received, the process proceeds to the step S105.

As shown in the FIG. 5, when the reference signal S_RS is received, the process proceeds to the step S105.

In the step S105, the synchronization unit 130 performs the synchronization procedure according to the reference signal S_RS.

Then, in the step S107, whether the synchronization procedure is finished is determined. If the synchronization procedure is finished, the process proceeds to the step S108.

In the step S108, the compensation unit 140 fetches the communication signal S_CM from the storage unit 120.

Next, in the step S111, the compensation unit 140 performs the compensation procedure on the communication signal S_CM.

Afterwards, in the step S112, the demodulation unit 150 demodulates the communication signal S_CM which is compensated. As shown in the FIG. 5, when the step S105 of performing the synchronization procedure is finished, the step S108 of fetching the communication signal S_CM from the storage unit 120 is immediately executed. Then, the step S111 of performing the compensation procedure on the communication signal S_CM and the step S112 of demodulating the communication signal S_CM are executed consecutively.

According to the example illustrated in the FIG. 5, even if the closest reference signal S_RS is received after the communication signal S_CM, this closest reference signal S_RS still could be used for the synchronization procedure. Therefore, the power consumption could be greatly reduced.

Figure 6:
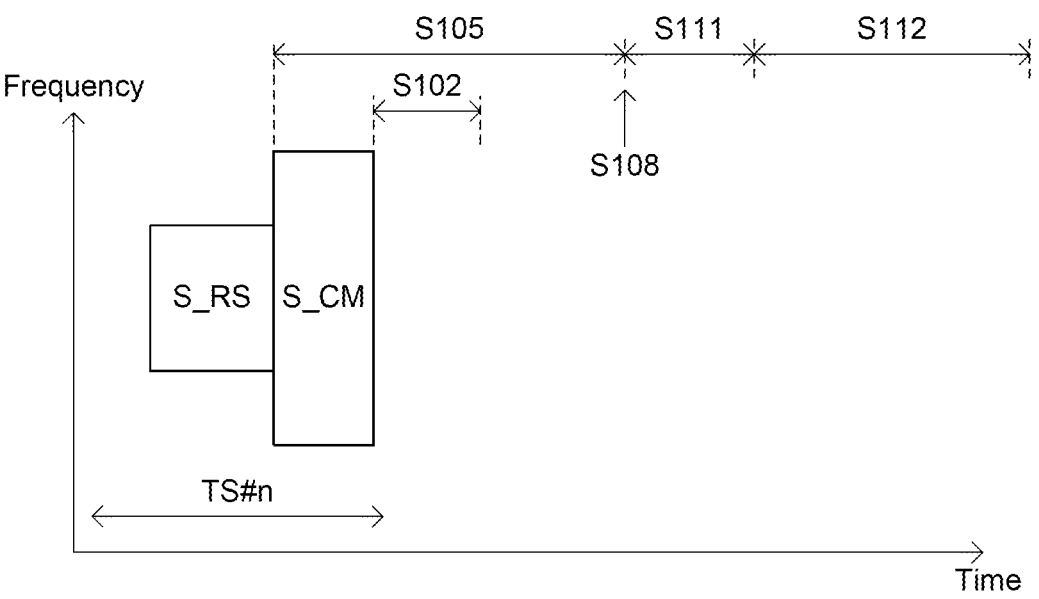
FIG. 6 illustrates the operation method of the wireless modem according to another example.

Please refer to FIG. 2 and FIG. 6. FIG. 6 illustrates the operation method of the wireless modem 100 according to another example. In step S101, whether the communication signal S_CM or the reference signal S_RS is received is determined. As shown in the FIG. 6, the reference signal S_RS and the communication signal S_CM are received at the same time slot TS #n. The reference signal S_RS is received before the communication signal S_CM, so the process proceeds to the step S105.

In the step S105, the synchronization unit 130 performs the synchronization procedure according to the reference signal S_RS.

Next, in the step S106, whether the communication signal S_CM is received is determined. If the communication signal S_CM is received is received, the process proceeds to the step S102.

As shown in the FIG. 6, when the communication signal S_CM is received, the process proceeds to the step S102.

In the step S102, the communication signal S_CM is buffered in the storage unit 120.

Then, in the step S107, whether the synchronization procedure is finished is determined. If the synchronization procedure is finished, the process proceeds to the step S108.

In the step S108, the compensation unit 140 fetches the communication signal S_CM from the storage unit 120.

Next, in the step S111, the compensation unit 140 performs the compensation procedure on the communication signal S_CM.

Afterwards, in the step S112, the demodulation unit 150 demodulates the communication signal S_CM which is compensated. As shown in the FIG. 6, when the step S105 of performing the synchronization procedure is finished, the step S108 of fetching the communication signal S_CM from the storage unit 120 is immediately executed. Then, the step S111 of performing the compensation procedure on the communication signal S_CM and the step S112 of demodulating the communication signal S_CM are executed consecutively.

According to the example illustrated in the FIG. 6, even if the synchronization procedure executed based on the closest reference signal S_RS cannot be finished before receiving the communication signal S_CM, the communication signal S_CM could be buffered and then fetched out when the synchronization procedure is finished. Therefore, the power consumption could be greatly reduced.

Figure 7:
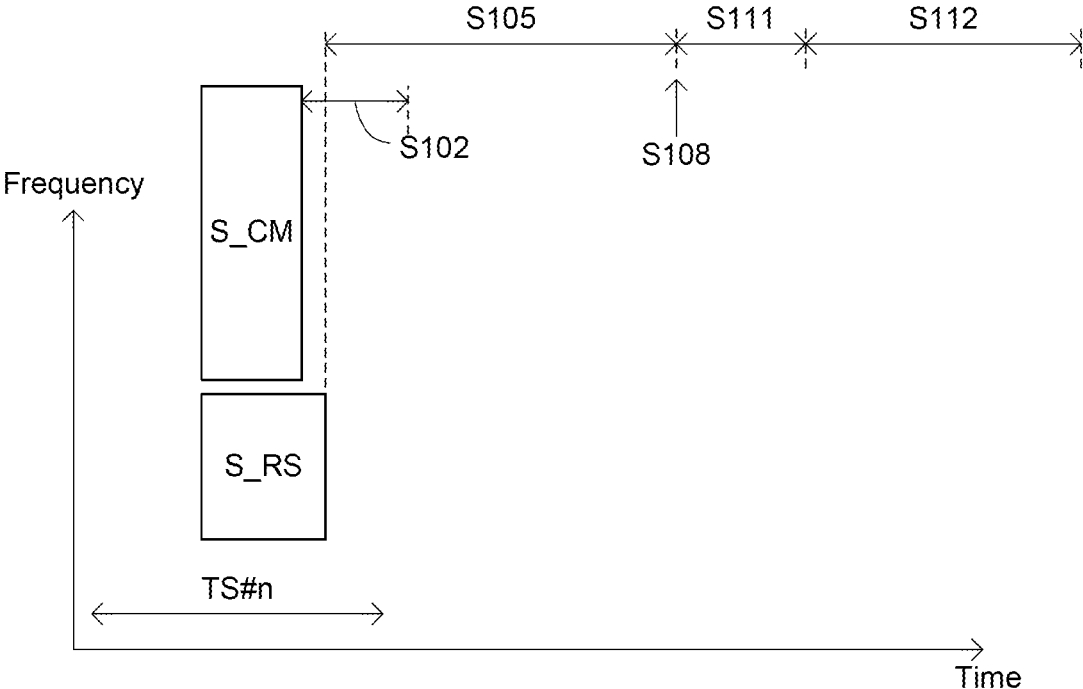
FIG. 7 illustrates the operation method of the wireless modem according to another example.

Please refer to FIG. 2 and FIG. 7. FIG. 7 illustrates the operation method of the wireless modem 100 according to another example. In step S101, whether the communication signal S_CM or the reference signal S_RS is received is determined.

As shown in the FIG. 7, a duration for receiving the communication signal S_CM is overlapped with a duration for receiving the reference signal S_RS in the identical time slot TS #n. Receiving the communication signal S_CM is finished before the reference signal S_RS, so the process proceeds to the step S102.

In the step S102, the communication signal S_CM is buffered in the storage unit 120.

Next, in the step S103, whether the reference signal S_RS is received is determined. As shown in the FIG. 7, when the reference signal S_RS is received, the process proceeds to the step S105.

In the step S105, the synchronization unit 130 performs the synchronization procedure according to the reference signal S_RS.

Then, in the step S107, whether the synchronization procedure is finished is determined. If the synchronization procedure is finished, the process proceeds to the step S108.

In the step S108, the compensation unit 140 fetches the communication signal S_CM from the storage unit 120.

Next, in the step S111, the compensation unit 140 performs the compensation procedure on the communication signal S_CM.

Afterwards, in the step S112, the demodulation unit 150 demodulates the communication signal S_CM which is compensated. As shown in the FIG. 7, when the step S105 of performing the synchronization procedure is finished, the step S108 of fetching the communication signal S_CM from the storage unit 120 is immediately executed. Then, the step S111 of performing the compensation procedure on the communication signal S_CM and the step S112 of demodulating the communication signal S_CM are executed consecutively.

According to the example illustrated in the FIG. 7, even if the duration for receiving the communication signal S_CM is overlapped with the duration for receiving the closest reference signal S_RS in the identical time slot TS #n, this closest reference signal S_RS still could be used for the synchronization procedure. Therefore, the power consumption could be greatly reduced.

Figure 8A:
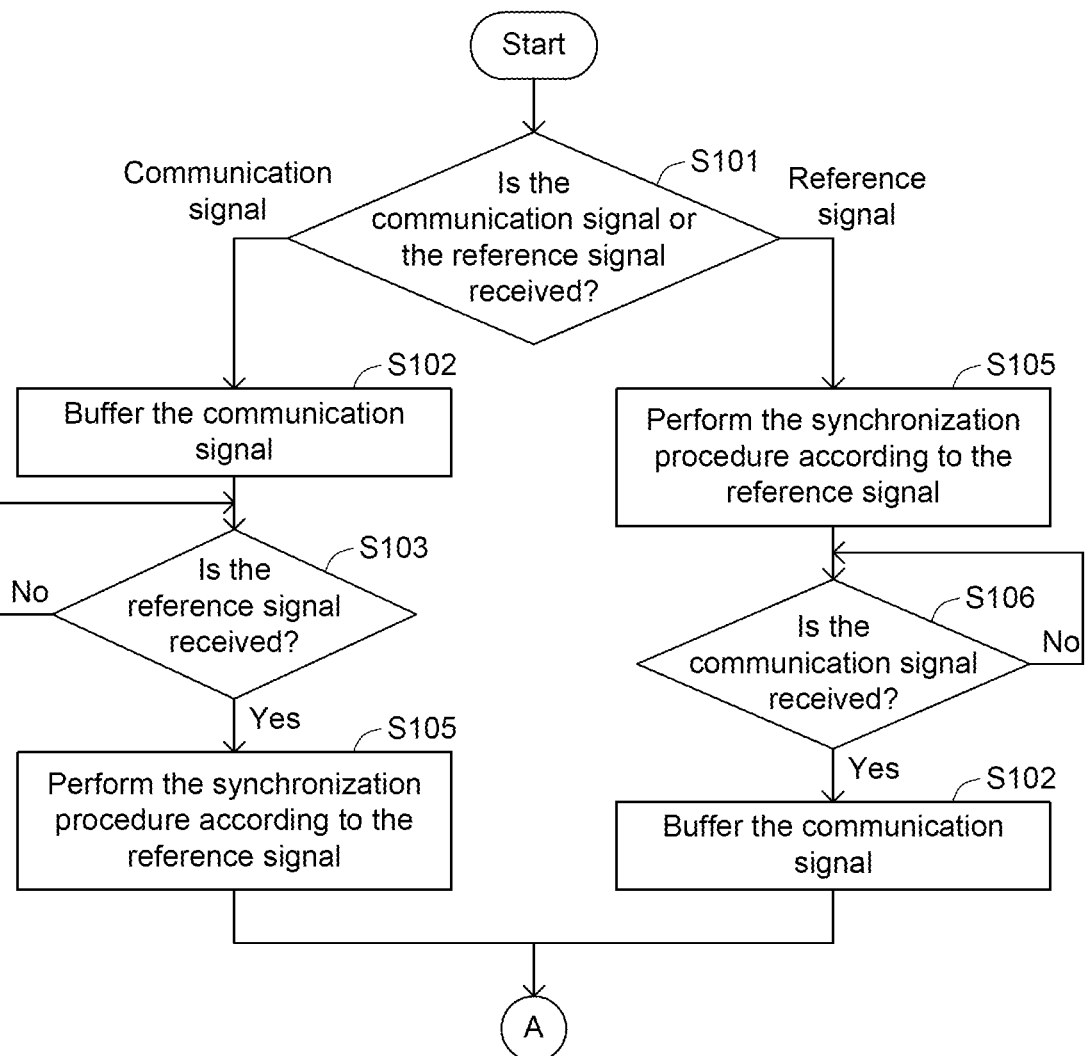
FIGS. 8A to 8B show a flowchart of an operation method of the wireless modem according to another embodiment.
Figure 8B:
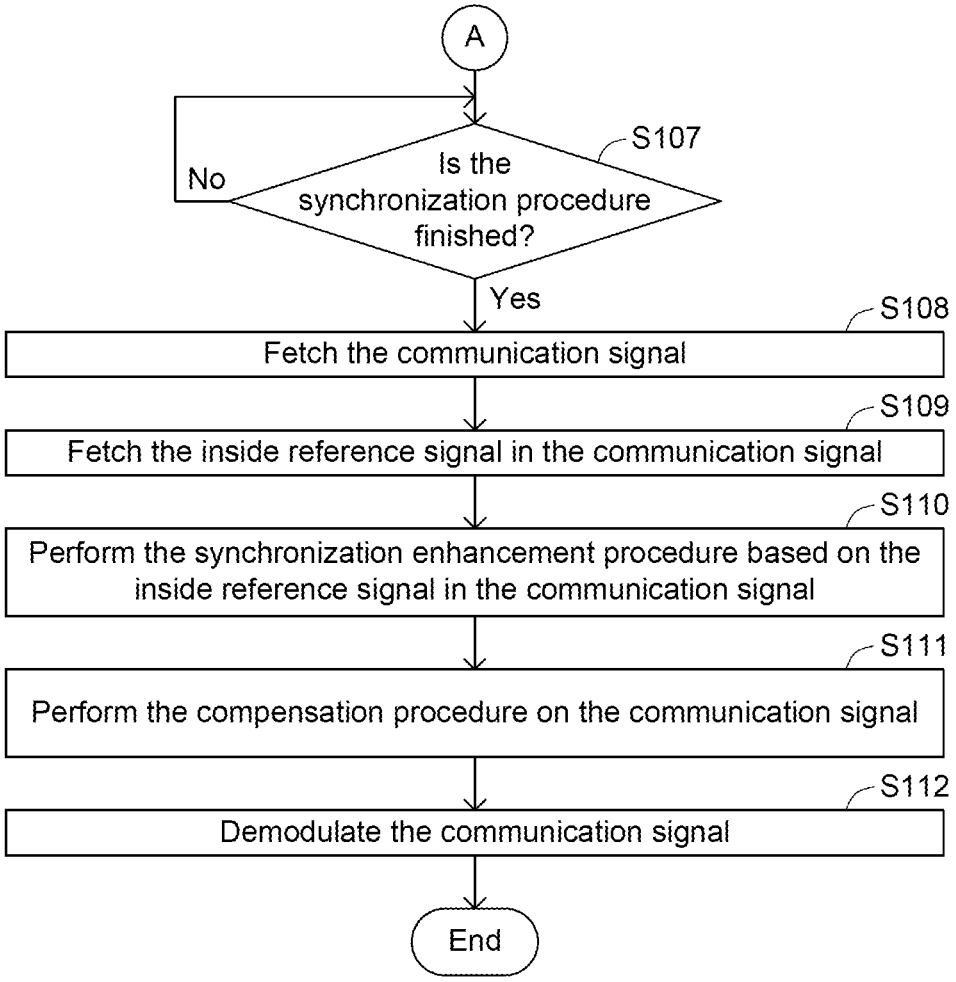

Please refer to FIGS. 8A to 8B, which show a flowchart of an operation method of the wireless modem 100 according to another embodiment. In one embodiment, the operation method of the wireless modem 100 may further include the steps S109 and S110. In the step S109, the synchronization unit 130 fetches an inside reference signal S_in in the communication signal S_CM from the storage unit 120.

Then, in the step S110, the synchronization unit 130 performs a synchronization enhancement procedure based on the inside reference signal S_in in the communication signal S_CM.

Because the communication signal S_CM is buffered, the inside reference signal S_in in the communication signal S_CM could be used to perform the synchronization enhancement procedure. Therefore, the synchronization accuracy could be greatly improved.

Figure 9:
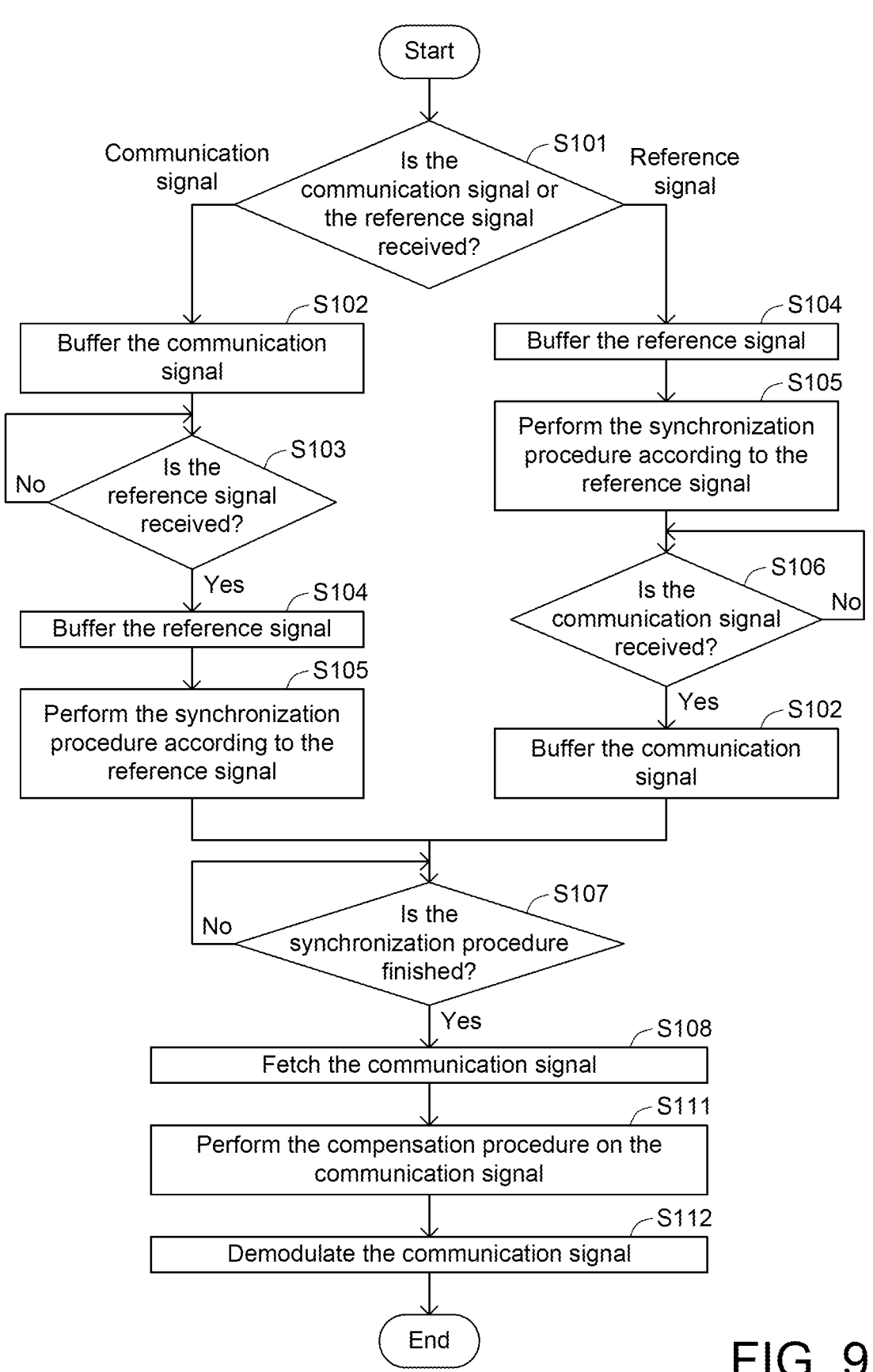
FIG. 9 shows a flowchart of an operation method of the wireless modem according to another embodiment.

Please refer to FIG. 9, which shows a flowchart of an operation method of the wireless modem 100 according to another embodiment. In one embodiment, the operation method of the wireless modem 100 may further include the step S104.

In the step S104, the reference signal S_RS is also buffered in the storage unit 120. The synchronization unit 130 could iteratively perform the synchronization procedure according to the stored reference signal S_RS. Therefore, the synchronization accuracy could be greatly improved.

According to the embodiments described above, regardless of whether the closest reference signal S_RS or the communication signal S_CM is received first, the communication signal S_CM could be fetched immediately after the synchronization procedure is finished and then the compensation procedure and the demodulation procedure of the communication signal S_CM could be performed consecutively. Therefore, the power consumption could be greatly reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operation method of a wireless modem, comprising:
buffering a communication signal in a storage unit when the communication signal is received, wherein the communication signal is a paging early indicator (PEI) signal, a paging signal or a radio resource management (RRM) signal;
performing a synchronization procedure when a reference signal is received;
fetching the communication signal from the storage unit when the synchronization procedure is finished;
performing a compensation procedure on the communication signal; and
demodulating the communication signal which is compensated,
wherein a duration for receiving the communication signal is overlapped with a duration for receiving the reference signal in an identical time slot.

2. The operation method of the wireless modem according to claim 1, wherein the step of fetching the communication signal from the storage unit is performed when the synchronization procedure is finished.

3. The operation method of the wireless modem according to claim 1, wherein the step of buffering the communication signal is performed during the step of performing the synchronization procedure.

4. The operation method of the wireless modem according to claim 1, wherein the communication signal is received after the reference signal.

5. The operation method of the wireless modem according to claim 1, wherein the communication signal is received before the reference signal.

6. The operation method of the wireless modem according to claim 1, wherein the communication signal is received after the reference signal in an identical time slot.

7. The operation method of the wireless modem according to claim 1, wherein the communication signal is received before the reference signal in an identical time slot.

8. The operation method of the wireless modem according to claim 1, further comprising:
fetching an inside reference signal in the communication signal from the storage unit; and
performing a synchronization enhancement procedure based on the inside reference signal in the communication signal.

9. The operation method of the wireless modem according to claim 1, further comprising:
buffering the reference signal in the storage unit.

10. A wireless modem, comprising:
a receiving unit, configured to receive a communication signal and a reference signal, wherein the communication signal is a paging early indicator (PEI) signal, a paging signal or a radio resource management (RRM) signal;
a storage unit, configured to buffer the communication signal when the communication signal is received;
a synchronization unit, configured to perform a synchronization procedure when the reference signal is received;
a compensation unit, configured to fetch the communication signal from the storage unit when the synchronization procedure is finished, and perform a compensation procedure on the communication signal; and
a demodulation unit, configured to demodulate the communication signal which is compensated,
wherein a duration for receiving the communication signal is overlapped with a duration for receiving the reference signal in an identical time slot.

11. The wireless modem according to claim 10, wherein the compensation unit fetches the communication signal from the storage unit when the synchronization unit finishes the synchronization procedure.

12. The wireless modem according to claim 10, wherein the communication signal is buffered to the storage unit during a duration for performing the synchronization procedure.

13. The wireless modem according to claim 10, wherein the receiving unit receives the communication signal after the reference signal.

14. The wireless modem according to claim 10, wherein the receiving unit receives the communication signal before the reference signal.

15. The wireless modem according to claim 10, wherein the receiving unit receives the communication signal after the reference signal in an identical time slot.

16. The wireless modem according to claim 10, wherein the receiving unit receives the communication signal before the reference signal in an identical time slot.

17. The wireless modem according to claim 10, wherein the synchronization unit is further configured to fetch an inside reference signal in the communication signal from the storage unit and perform a synchronization enhancement procedure based on the inside reference signal in the communication signal.

18. The wireless modem according to claim 10, wherein the storage unit is further configured to buffer the reference signal.

* * * * *